US008023461B2

(12) United States Patent
Lintulampi et al.

(10) Patent No.: US 8,023,461 B2
(45) Date of Patent: *Sep. 20, 2011

(54) METHOD AND APPARATUS FOR SHARING UPLINK STATE FLAG (USF) WITH MULTIPLE UPLINK TEMPORARY BLOCK FLOWS (TBFS)

(75) Inventors: Raino Lintulampi, Kiviniemi (FI); Janne Parantainen, Helsinki (FI); Guillaume Sebire, Helsinki (FI)

(73) Assignee: Nokia Corporation, Espoo (FI)

( * ) Notice: Subject to any disclaimer, the term of this patent is extended or adjusted under 35 U.S.C. 154(b) by 674 days.

This patent is subject to a terminal disclaimer.

(21) Appl. No.: 12/077,551

(22) Filed: Mar. 20, 2008

(65) Prior Publication Data

US 2009/0010212 A1    Jan. 8, 2009

Related U.S. Application Data

(63) Continuation of application No. 10/834,314, filed on Apr. 28, 2004, now Pat. No. 7,362,725, which is a continuation of application No. 09/968,747, filed on Oct. 1, 2001, now Pat. No. 6,747,962.

(60) Provisional application No. 60/238,998, filed on Oct. 10, 2000.

(51) Int. Cl.
 *H04W 4/00* (2009.01)
(52) U.S. Cl. ........................................................ 370/329
(58) Field of Classification Search .................. 370/329, 370/328, 338, 349, 468, 331, 333, 334, 335, 370/336, 401
See application file for complete search history.

(56) References Cited

U.S. PATENT DOCUMENTS 5,784,362 A    7/1998 Turina .......................... 370/321
(Continued)

FOREIGN PATENT DOCUMENTS

WO    WO-00/54464 A1    9/2000
(Continued)

OTHER PUBLICATIONS

Digital Cellular Telecommunications System (Phase2+); General Packet Radio Service (GPRS); Overall Description of the GPRS Radio Interface; Stage 1 (GSM 03.64 Version 7.0.0 Release 1998) European Telecommunication Standard XX, XX, Jul. 1999 pp. 1-42).

(Continued)

*Primary Examiner* — Chi Pham
*Assistant Examiner* — Alexander Boakye
(74) *Attorney, Agent, or Firm* — Harrington & Smith

(57) ABSTRACT

A method and an apparatus are described for increasing the flexibility of uplink resource allocation for a mobile station (MS) (100), that is backwards compatible with earlier standards that provide only a single data flow per MS. The method includes steps of (A) associating an allocated uplink resource (an Uplink State Flag (USF)) with one or more Temporary Block Flows (TBFs) for a Packet Data Channel (PDCH), and not with a MS per se (although a given USF is associated with only a single MS); and (B) using a Temporary Flow Identity (TFI) for identifying a TBF, where a TFI may be unique to a PDCH and, if not, is unique with respect to the MS on a PDCH (and hence with respect to the USF). The result is that the MS is enabled to send any of its TBFs on allocated resources of the same PDCH. An uplink resource may be allocated to the MS dynamically using the Uplink State Flag (USF) or by using a fixed allocation. A total of n Radio Bearers are associated with a single TBF, where n≥1.

18 Claims, 4 Drawing Sheets

U.S. PATENT DOCUMENTS

| | | | |
|---|---|---|---|
| 6,031,832 A | 2/2000 | Turina | 370/348 |
| 6,356,759 B1 | 3/2002 | Mustajarvi | 455/450 |
| 6,438,114 B1 | 8/2002 | Womack et al. | 370/329 |
| 6,466,568 B1 | 10/2002 | Raith et al. | 370/347 |
| 6,477,176 B1 | 11/2002 | Hamalainen et al. | 370/435 |
| 6,532,225 B1 | 3/2003 | Chang et al. | 370/341 |
| 7,177,298 B2 | 2/2007 | Chillariga et al. | 370/348 |
| 7,362,725 B2 * | 4/2008 | Lintulampi et al. | 370/329 |

FOREIGN PATENT DOCUMENTS

| | | |
|---|---|---|
| WO | WO-0056095 A | 9/2000 |

OTHER PUBLICATIONS

3 GPP TS 43.051; vol. 5.2.0 Jun. 2001; pp. 2.

3GPP TS 44.060; vol. 4.3.0; Sep. 2001; pp. 18-20, 60-63, 66-67.

* cited by examiner

METHOD AND APPARATUS FOR SHARING UPLINK STATE FLAG (USF) WITH MULTIPLE UPLINK TEMPORARY BLOCK FLOWS (TBFS)

CROSS-REFERENCE TO RELATED APPLICATIONS

This patent application is a continuation of U.S. patent application Ser. No. 10/834,314 (filed on Apr. 28, 2004), now U.S. Pat. No. 7,362,725 which is a continuation of U.S. patent application Ser. No. 09/968,747 (filed on Oct. 1, 2001 and issued as U.S. Pat. No. 6,747,962 on Jun. 8, 2004) which in turn claims priority from Provisional Patent Application No. 60/238,998 (filed on Oct. 10, 2000).

FIELD OF THE INVENTION

This invention relates generally to method and apparatus for transmitting and receiving packet data over a wireless interface and, more particularly, relates to methods and apparatus for transmitting and receiving packet data between a wireless user terminal and a network operator in a digital cellular telecommunications system.

BACKGROUND OF THE INVENTION

Modern wireless telecommunications systems are evolving to provide high speed packet data services for users of mobile equipment. One example is an ability to provide internet access to a user of mobile equipment. A wireless system that is rapidly evolving in this direction is a Time Division, Multiple Access (TDMA) system known as the Global System for Mobile Communication (GSM), in particular enhanced versions of GSM known as GSM+, GPRS (General Packet Radio Services) and EGPRS (Enhanced General Packet Radio Services).

The GPRS Release '97 was the first standard to provide (limited) packet data services. However, this standard did not provide a capability for the user to control the bit rate(s) and delays for a packet data connection. In the developing Universal Mobile Telecommunication System (UMTS) packet domain permits several packet data connections to be simultaneously maintained, with different qualities of service. Although there have, at present, been two subsequent GPRS releases since the Release '97, the quality of service concept has remained the same.

The GSM/EDGE radio access network (GERAN) release 5 (or simply R5) provides a new radio access network to the UMTS core network, and is to adopt the same quality of service attributes as used in the existing UMTS.

In the UMTS a data connection between a mobile station (MS), such as a cellular telephone, and the third generation (3G) Serving GPRS Support Node (SGSN), or 3G-SGSN, is identified using the Network Service Access Point Identifier (NSAPI) with which the requested quality of service (QoS) parameters are associated. The data connection is realized by a radio access bearer established by the 3G-SGSN to the radio access network. The radio access bearer identity is the same as the NSAPI. That is, in UMTS the data connection is identified using the NSAPI, which also identifies a radio access bearer. In the radio interface the radio access bearer is realized by one or several radio bearers, each having their own identities. During the radio bearer set-up phase the NSAPI is associated with radio bearers and the radio bearers are associated with a channel. As such, in the UMTS radio access network the channel number/identifier unambiguously identifies the data connection and its quality of service parameters and, hence, there is no need to carry either the NSAPI or radio bearer identity in protocol headers.

However, in GERAN R5 there is no provision to associate a data connection to a (physical) channel. As such, one problem that arises is how to identify a data connection in the radio interface.

A second issue relates to improving the flexibility of the GPRS Radio Link Control/Media Access Control (RLC/MAC) layer. An important distinction between the basic GPRS and the UMTS Radio Access Network (URAN) is that the GPRS MAC multiplexes Logical Link (LL) Protocol Data Units (PDUs), while UMTS multiplexes transport (Radio Link Control or RLC) blocks. In general, GPRS multiplexing is inflexible, and is not suitable for connections having different quality of service requirements.

In EGPRS the same access types as in GPRS are supported to establish the Temporary Block Flow (TBF) in the uplink direction (i.e., from the mobile equipment or station to the network). To accomplish this, a control message used by a GPRS mobile equipment to request a packet channel (Packet Channel Request, 11 bits) is re-used for EGPRS.

With Release 5 the standard RLC and MAC sublayers are required to support multiple data flows with different QoS requirements simultaneously. However, the modifications made to the Release 4 (R4) standard to derive the R5 standard must be backward compatible with R4 (and earlier releases back to R97). That is, different mobile stations (MSs) from different releases (R97-R5) must be able to be multiplexed onto the same Packet Data Channels (PDCHs). Put another way, there is no segregation of traffic between R5 MSs and pre-R5 MSs. This implies that the multiplexing fields Temporary Flow Identity (TFI) and Uplink State Flag (USF) in the headers of the RLC/MAC protocol data units must remain unchanged.

Currently in R97-R4 only one data flow at a time is allowed in the MS, in either the uplink or the downlink direction. This data flow is transported on a Temporary Block Flow (TBF) which is identified by a TFI. That is, the TFI uniquely identifies a MS/TBF pair. In the downlink direction (to the MS) the TFI is used to address a block to the MS, and in the uplink direction (from the MS) the TFI is used to identify the owner (MS) of the incoming data block. On a given PDCH a maximum of 32 TBFs (TFI is 5 bits) are allowed in either the uplink or the downlink directions. The USF is used for the dynamic allocation of uplink resources, while on a downlink PDCH Radio Link Control (RLC) data blocks are appended with a USF (by the Media Access Control (MAC)), the value of which allows a unique MS to send one (or four) data blocks in the uplink direction in predefined blocks on the corresponding uplink PDCH. That is, no other MS is allowed to use these blocks. The USF is 3 bits, thereby enabling dynamic allocation for eight different MSs. This implies only eight different dynamic TBFs.

Introducing multiple flows per MS in the uplink through multiple TBFs would thus imply, in this context, that several considerations be made. First, a MS may have several USFs reserved for it: one for each TBF. As such, dynamic allocation is highly restrained. Second, this further implies that the number of MSs on a given PDCH is also highly restrained (maximum of 32 TBFs on the PDCH). Actually, due to the USF constraint only eight MSs in dynamic allocation can be supported per uplink PDCH. Third, introducing multiple flows per MS further implies that the network (NW) schedules all uplink flows, i.e., the MS cannot perform its own scheduling in the uplink direction, which implies further delays in transmitting data. That is, a MS must obtain authorization from the NW before it is enabled to send a particular TBF, which may be unacceptable depending on the desired QoS of the data flow.

The inventors have realized that all uplink resources are under NW control (fixed allocation, dynamic allocation, extended dynamic allocation), which implies that the NW has knowledge of from which MS it will be receiving a data block at any given point in time. Note should be made of the fact that, because of this NW knowledge, the existing TFI in the uplink data blocks is actually not needed, that is, a given MS is not allowed to transmit when it wishes, but only when it is given permission to transmit.

OBJECTS AND ADVANTAGES OF THE INVENTION

It is a first object and advantage of this invention to provide a method and apparatus for providing multiple data flows in the uplink direction for a given MS.

It is a further object and advantage of this invention to provide a method and apparatus for providing multiple parallel data flows in the uplink direction for a given MS, which method and apparatus are backwards compatible with Releases 1997 through 1999, in that no changes are required to the existing RLC/MAC block structure and headers.

SUMMARY OF THE INVENTION

The foregoing and other problems are overcome and the objects of the invention are realized by methods and apparatus in accordance with embodiments of this invention.

A method and an apparatus are described for increasing the flexibility of uplink resource allocation for a mobile station (MS), that is backwards compatible with earlier standards that provide only a single data flow per MS. The method includes steps of (A) associating an allocated uplink resource (an Uplink State Flag (USF)) with one or more Temporary Block Flows (TBFs) for a Packet Data Channel (PDCH), and not with a MS per se (although a given USF is associated with only a single MS); and (B) using a Temporary Flow Identity (TFI) for identifying a TBF, where a TFI may be unique to a PDCH and hence across MSs on a PDCH and, if not, is unique with respect to the MS on a PDCH (implying unity with respect to the USF) and hence may be repeated across MSs on a PDCH. The result is that the MS is enabled to send any of its TBFs that are allocated to that PDCH on allocated resources. TFI may also be unique with respect to the USF but not necessarily with the MS (implying that there may be more than 32 TFIs/MS on a PDCH.) In this case TFIs may be repeated across USFs of one MS on a PDCH, and the MS is enabled to send any of its flows that are assigned to that USF on the allocated resource. An uplink resource may be allocated to the MS dynamically using the Uplink State Flag (USF) or by using a fixed allocation.

In one case only those TBFs that have been assigned to a USF can be sent on that resource. In another case, where TFIs are unique for the MS on the PDCH, another TBF that has been assigned to a different USF of the same MS on the same PDCH can be sent on that resource. This would typically be done if, for example, there is no data to transmit on TBFs that have been assigned to the USF.

A total of n Radio Bearers are associated with a single TBF, where n ≧ 1.

Note that a purpose of this invention is not necessarily to increase the number of mobile stations per PDCH (eight are still supported) but to instead increase the number of flows, as well as to increase the flexibility of uplink resource allocation.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
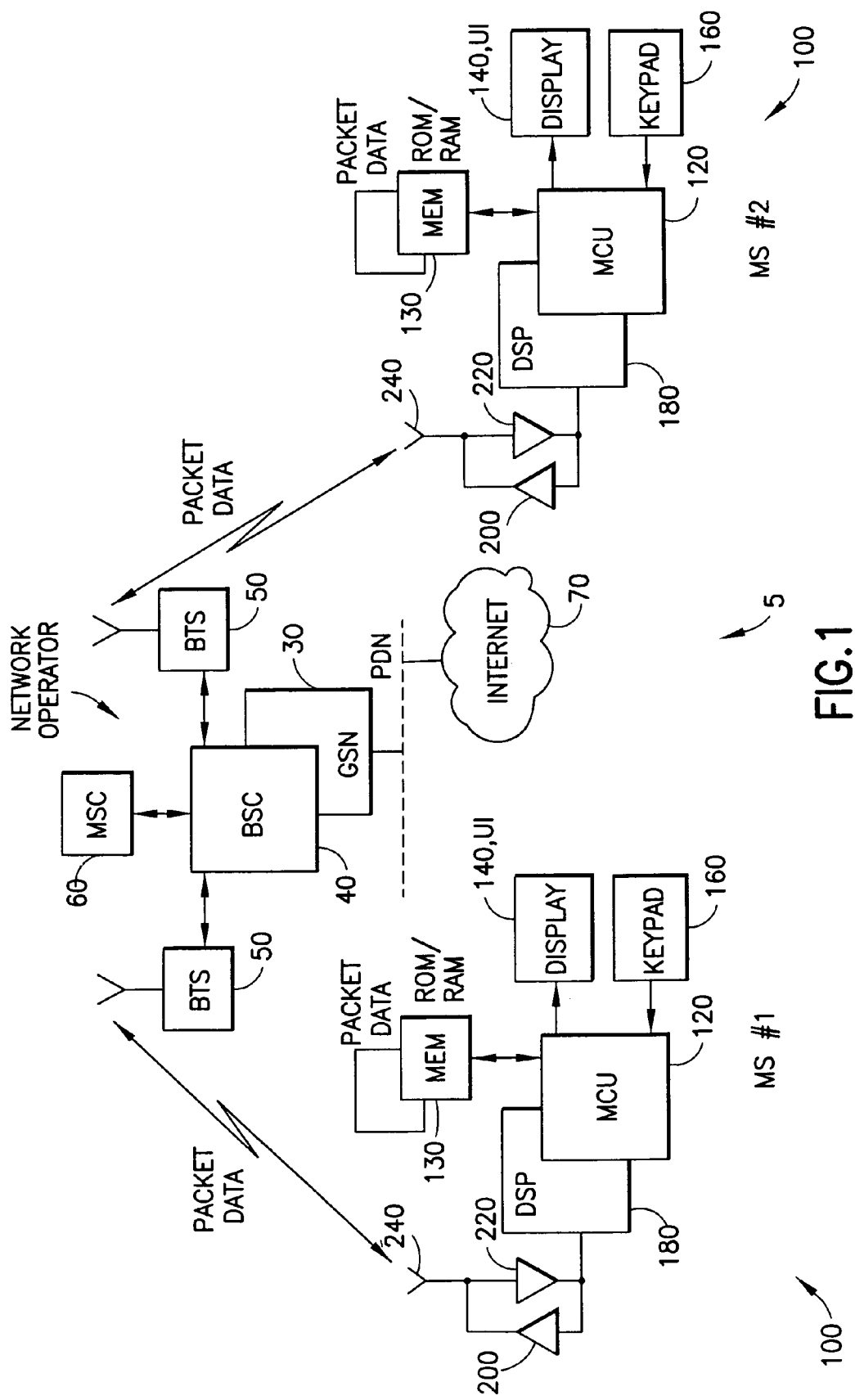
FIG. 1 is a simplified block diagram of telecommunications system that is suitable for practicing this invention.

Referring first to FIG. 1, there is illustrated a simplified block diagram of an embodiment of a wireless communications system 5, suitable for practicing this invention, that includes a plurality of mobile stations 100. Two mobile stations (MSs) are shown in FIG. 1 for convenience, with one being designated MS#1 and the other MS#2. FIG. 1 also shows an exemplary network operator having, for example, a GPRS Support Node (GSN) 30 for connecting to a telecommunications network, such as the Public Packet Data Network or PDN, at least one base station controller (BSC) 40, and a plurality of base transceiver stations (BTS) 50 that transmit in a forward or downlink direction both physical and logical channels to the mobile stations 100 in accordance with a predetermined air interface standard. A reverse or uplink communication path also exists from the mobile station 100 to the network operator, which conveys mobile originated access requests and traffic, and which uses the knowledge of allocated uplink resources, e.g. the USF and TFI in accordance with the teachings herein.

In a preferred, but not limiting, embodiment of these teachings, the air interface standard can conform to any standard that enables packet data transmissions to occur with the mobile stations 100, such as Internet 70 access and web page downloads. In the presently preferred embodiment of this invention the air interface standard is a Time Division Multiple Access (TDMA) air interface that supports the enhanced GPRS capabilities disclosed herein.

The network operator may also include a Message Service Center (MSC) 60 that receives and forwards messages for the mobile stations 100, although any wireless messaging technique that is capable of using packet data can be used. Other types of messaging service may include Supplementary Data Services and one under currently development and known as Multimedia Messaging Service (MMS), wherein image messages, video messages, audio messages, text messages, executables and the like, and combinations thereof, can be transferred between a network and a mobile station.

The mobile station 100 typically includes a microcontrol unit (MCU) 120 having an output coupled to an input of a display 140 and an input coupled to an output of a keyboard or keypad 160. The mobile station 100 may be considered to be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a read-only memory (ROM) for storing an operating program, as well as a random access memory (RAM) for temporarily storing required data, scratchpad memory, received packet data, packet data to be transmitted, and the like. A separate, removable SIM (not shown) can be provided as well, the SIM storing, for example, a preferred Public Land Mobile Network (PLMN) list and other subscriber-related information. The ROM is assumed, for the purposes of this invention, to store a program enabling the MCU 120 to execute the software routines, layers and protocols required to implement the transmission and reception of packet data in accordance with the teachings herein, as well as to provide a suitable user interface (UI), via display 140 and keypad 160, with a user. Although not shown, a microphone and speaker are typically provided for enabling the user to conduct voice calls in a conventional manner.

The mobile station 100 also contains a wireless section that includes a digital signal processor (DSP) 180, or equivalent high speed processor, as well as a wireless transceiver comprised of a transmitter 200 and a receiver 220, both of which are coupled to an antenna 240 for communication with the network operator. Packet data is transmitted and received through the antenna 240, in accordance with the teachings herein.

Having thus described a suitable embodiment of a wireless communications network and system for practicing this invention, a description of this invention is now provided.

This invention provides for allocating resources, with the USF, to one or more TBFs, i.e., those TBFs that are assigned to a USF can utilize the allocated resources. That is, one or more TBFs (TFIs) share an allocated resource (a USF) on a PDCH, where a given USF belongs to or is associated with only one MS 100. In this case the TFI value in an uplink header may be considered to not uniquely identify the MS 100, but to instead identify the TBF that associated with a given MS 100.

Preferably, in the case where there is no data on the TBFs assigned to the USF then the MS 100 may send any of its TBFs. In this manner the resource (USF) is assigned to a group of TBFs, and the MS 100 performs the scheduling within the group of TBFs. If none of the TBFs have data, and assuming that the TFIs are unique per MS on the PDCH, then TBFs assigned to other USFs of the same MS 100 on that PDCH may utilize the resource.

In one case only those TBFs that have been assigned to a USF can be sent on that resource. In another case where TFIs are unique per MS on the PDCH, then another TBF that has been assigned to a different USF of the same MS 100 on the same PDCH can be sent on that resource. This would typically be done if, for example, there is no data to transmit on TBFs that have been assigned to the USF.

There may be one or more allocated resources (USFs) with one or more TBFs per MS 100 on a given PDCH. Additionally, there may be one or more allocated resources (USFs) with one or more TBFs per MS 100 on more than one PDCH.

For the case where TFIs are unique on a PDCH then a maximum number of TBFs per PDCH is, for example, 32. In this case it is possible to identify the MS 100 based on either the USF or the TFI. That is, no other MS 100 can have the same USF and TFI values on a given PDCH.

Further in this regard, and because it is possible to identify the MS 100 based on the USF, the TFIs need not be unique per PDCH, but only unique with respect to the MS on the PDCH (implying unity with respect to the USF) or they may be only unique with respect to the USF. In these latter cases the entire TFI number space may be used with every MS on the PDCH or with every USF, respectively. That is, USFs are made unique on a PDCH, but when the network allocates uplink resources with a USF to a set of TBFs, at most 32 TBFs may share the resource. In this manner the maximum number of TBFs would be, in this example, 32 per USF, and with eight USF values there would be 8×32=256 TBFs per PDCH.

As a consequence of the foregoing, the MS 100 is free to send any of its TBFs on a PDCH on the allocated (Fixed or dynamic) resources of the PDCH, provided the TFIs are unique with respect to the MS 100 on the PDCH, and possibly to the PDCH alone. That is, the NW schedules the MS 100 in the uplink, but the MS 100 schedules its TBFs in the uplink on the allocated resources of the PDCH.

As a further consequence of the foregoing, a TFI value may be repeated across mobile stations 100 on a PDCH, i.e., there may be 32 uplink TBFs for each MS 100 (which equals one USF if one USF/MS/PDCH is allocated) on any uplink PDCH.

In view of the foregoing, and further in accordance with the teachings of this invention, a TBF is preferably kept alive or active (TFI reserved) for the lifetime of the Radio Bearer it carries, as long as the PDCH is not changed. This is true even if the transmission buffer (in memory 130) is empty, as the MS 100 may have as many Radio Bearers as TBFs. There are 32 Radio Bearer identifications (RBids), as there are 32 different TFIs. Note should be made that if the MS 100 has more than 32 flows/PDCH (which is unlikely) then the TFI-RB mapping can be redefined during the connection. This avoids having several time consuming TBF establishments for a given Radio Bearer.

A TFI (in the uplink) may uniquely identify a Radio Bearer, i.e., there may be a one-to-one mapping between the TFI and the RBid. However, it should be appreciated that in other embodiments of this invention more than one Radio Bearer can be sent over a single TBF. That is, a total of n Radio Bearers are associated with a single TBF, where n is equal to one or is greater than one.

Further in accordance with the teachings of this invention, fast access is preferably used if the MS 100 has no allocated resources for transmitting a given Radio Bearer on an already established TBF. In this case the MS Class, radio priority and other information may be stored in the network to facilitate the fast access.

Still further in accordance with the teachings of this invention USFs and TBFs may be kept reserved for a given MS 100 continuously, or they may be released when the last block is transmitted. The USF may also be released if an inactivity counter exceeds a certain value.

Note that the TBF and the USF may be assigned and released independently. That is, the release of a TBF does not necessarily lead to the release of the USF with which it is associated. The allocation of a TBF can be done on an already assigned USF.

It can be appreciated that in accordance with an embodiment of these teachings: (A) a TBF is established once and only once for each particular Radio Bearer in the uplink; and (B) due to the potentially large number of TBFs (data flows permitted per MS 100 in the uplink), there is no need to modify the TFI and the USF as currently specified, making the teachings of this invention both backwards and forwards compatible.

Figure 2:
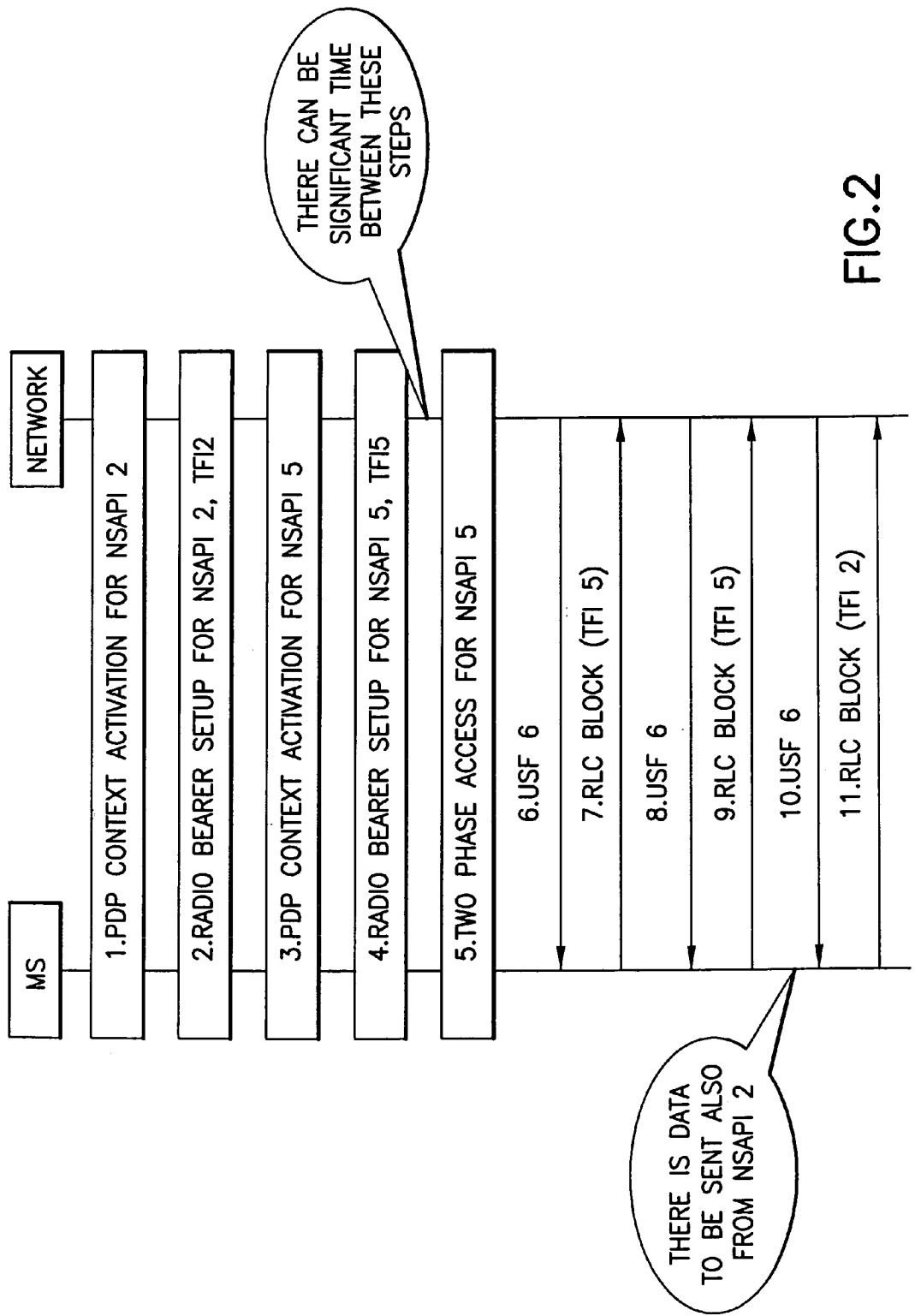
FIG. 2 illustrates a the usage of USF and TFIs in the context of this invention for establishing multiple parallel uplink data flows in a backwards compatible manner.

Turning now to FIG. 2, there is shown an example of the usage of the USF and the TFIs between the MS 100 and the NW in accordance with the foregoing teachings. It should be noted at the outset that the teachings of this invention are not restricted to the use of the USF, i.e., dynamic channel allocation, but can be utilized as well with fixed channel allocation.

At Step 1 the PDP context is activated for network service access point (NSAPI) 2, which could be used for, by example, web browsing. The PDP context activation includes the exchange of messages Activate PDP Context Request and Activate PDP Context Accept.

At Step 2 a Radio Bearer is established for the activated PDP context. A temporary block flow (TBF) identifier (TFI) is already allocated at this phase. The value of TFI may be same as the NSAPI value, although this is not required. In this example the same value is allocated for the TFI(2). Note should be made that if it is required that the value of NSAPI and TFI always be equal, then TFI is not required to be included in Radio Bearer setup messages. The Radio Bearer setup includes the exchange of messages such as Radio Bearer Setup, from the NW to the MS 100, and Radio Bearer Setup Complete (from the MS 100 to the NW). No physical radio resources (radio channels) are allocated during this procedure.

At Step 3 the PDP context is activated for NSAPI 5 to accomplish, for example, email uploading.

At Step 4 a Radio Bearer is established for the activated PDP context, and the TFI value of 5 is allocated.

At Step 5 the user desires to start, by example, email uploading. A physical radio resource is requested and allocated. It should be noted that a significant amount of time can elapse between Radio Bearer setup and physical resource allocation (e.g., several minutes). Hence, those skilled in the art can appreciate that the usage of TFI is significantly different that the usage currently specified in GPRS R97/R99.

At Step 6 the NW allows the MS 100 to send data in the uplink.

At Step 7 the RLC block (TFI 5) is transmitted.

At Step 8 the NW permits the MS 100 to send data in the uplink.

At Step 9 the RLC block (TFI 5) is transmitted. Since email uploading does not require any user actions, the user may wish to perform web browsing at the same time the email is being uploaded and, for example, a command to download a new web page may be sent from the MS web client to the NW.

At Step 10 the network permits the MS 100 to send data in the uplink.

At Step 11, because web browsing typically has stricter delay requirements than the email application, email uploading is interrupted and the allocated uplink slot is used for sending the web client request from the MS 100. Note should be made that the earlier allocated TFI value is used in the RLC/MAC header, which enables the receiving end to identify the data connection.

It should be noted that the foregoing method employs the RLC/MAC headers currently specified in GSM 04.60, and there is no requirement to modify the headers. This fulfils a stated object and advantage of this invention.

Figure 3:
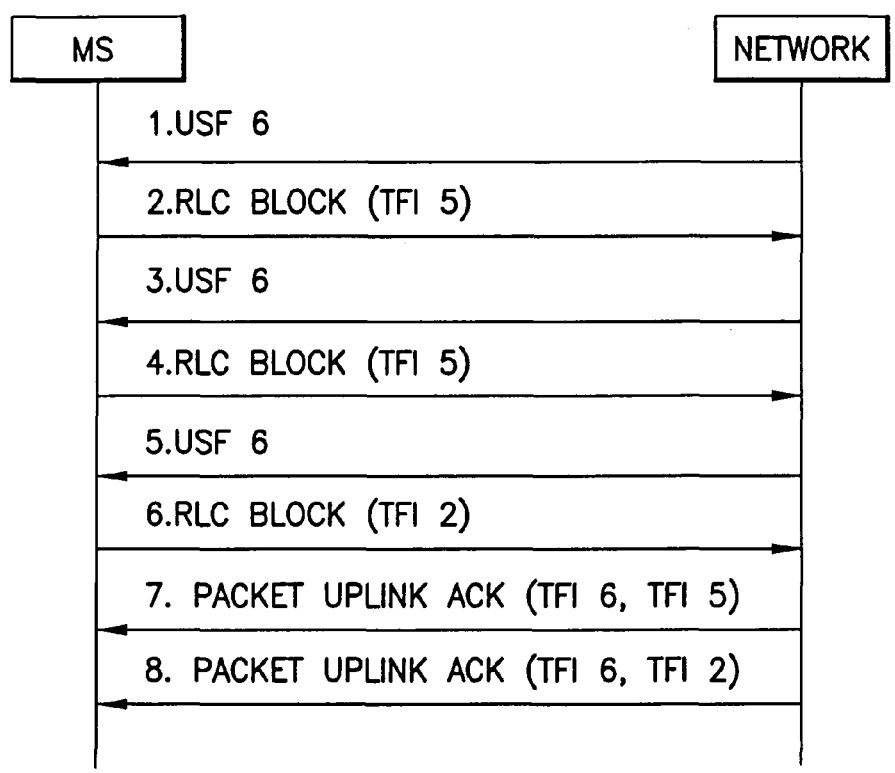
FIG. 3 illustrates a the usage of USF, TFIs, and ack/nack messages in the context of dynamic allocation of uplink resources in this invention for establishing multiple parallel uplink data flows in a backwards compatible manner.

The method of the present invention uses a new interpretation of a TFI field in the Packet uplink ack/nack and packet uplink assignment messages. The uplink messages are acknowledged by the network using a Packet uplink ack/nack message. The MS receives all messages on the PDCH where uplink resources are allocated to the MS. The MS decodes the RLC/MAC header and if the TFI in the message is the same as that allocated to the MS in the Packet uplink assignment message, then the MS knows that it is the intended target of the message. In the method disclosed herein the uplink TFI can be used by several MSs on the same PDCH. Therefore, the TFI used in the uplink is not used to identify the MS in the downlink direction. There are two alternatives to identify the MS in the downlink direction:

(A) When dynamic allocation of uplink resources is used, a USF can be used to identify the MS 100. Only eight MSs in dynamic allocation can share the same PDCH in an uplink. Therefore, those eight values can be used to identify the MS also in the downlink, for example, in Packet uplink ack/nack message. The actual TBF that is acknowledged is identified using TFI in the message body. FIG. 3 illustrates this alternative.

Figure 4:
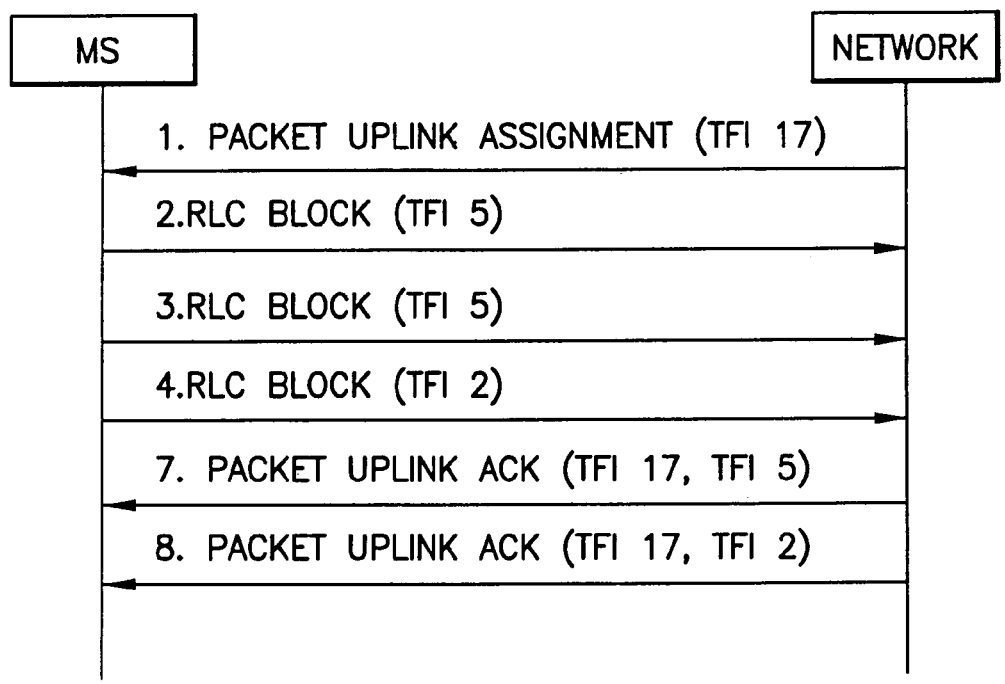
FIG. 4 illustrates a the usage of USF, TFIs, and ack/nack messages in the context of fixed allocation of uplink resources in this invention for establishing multiple parallel uplink data flows in a backwards compatible manner.

(B) With the use of fixed allocation of uplink resources, no USF is allocated for the MS and, hence, a USF is not used to identify the MS. In the Packet uplink assignment message the TFI is allocated to the MS. In accordance with the present method, this TFI value is not used to identify the MS in the uplink direction but the allocated uplink resource identifies the MS. However, the allocated TFI value can be used to identify the MS in the downlink direction. In this case, the TFI in the RLC/MAC header is different from the TFI used in the message body, for example in Packet uplink ack/nack message. FIG. 4 illustrates this alternative.

Both of the alternatives presented above do not require any changes to the existing GPRS control headers, the new terminal only interprets fields differently as earlier GPRS release terminals.

Turning now to FIG. 3, there is shown an example of the usage of the USF and the TFIs between the MS and the NW in the instance of the dynamic allocation of uplink resources to the MS, and the Packet uplink ack/nack messaging in accordance with the foregoing teachings.

At Step 1 the NW allows the MS to send data in the uplink.

At Step 2 the RLC block (TFI 5) is transmitted.

At Step 3 the NW permits the MS to send data in the uplink.

At Step 4 the RLC block (TFI 5) is transmitted from the MS identified by the TFI (5).

At Step 5 the network permits the MS to send data in the uplink.

At Step 6 the RLC block (TFI 2) is transmitted from the MS identified by the TFI (2).

At Step 7 the NW acknowledges the received RLC blocks. The TFI in the RLC/MAC control header has the USF value (6) that was allocated to the MS 100. The TFI (5) in the Packet uplink ack/nack message body identifies the TBF. The messages received on this TBF are only acknowledged in this message.

At Step 8 the NW acknowledges the received RLC blocks. The TFI in the RLC/MAC control header has the USF value (6) that was allocated to the MS 100. The TFI (2) in the Packet uplink ack/nack message body identifies the TBF. The messages received on this TBF are only acknowledged in this message.

Turning now to FIG. 4, there is shown an example of the usage of the USF and the TFIs between the MS 100 and the NW in the instance of fixed allocation of uplink resources to the MS 100, and Packet uplink ack/nack messaging in accordance with the foregoing teachings.

At Step 1 the NW allows the MS 100 to send data in the uplink. The allocated TFI (17) is used in the downlink to identify the MS.

At Step 2 the RLC block (TFI 5) is transmitted from the MS 100 identified by the TFI (5).

At Step 3 the RLC block (TFI 5) is transmitted from the MS 100 identified by the TFI (5).

At Step 4 the RLC block (TFI 2) is transmitted from the MS identified by the TFI (2).

At Step 5 the NW acknowledges the received RLC blocks. The TFI in the RLC/MAC control header has the USF value (17) that was allocated to the MS 100 in the Packet uplink assignment message. The TFI (5) in the Packet uplink ack/nack message body identifies the TBF. The messages received on this TBF are only acknowledged in this message.

At Step 6 the NW acknowledges the received RLC blocks. The TFI in the RLC/MAC control header has the USF value (17) that was allocated to the MS 100 in the Packet uplink assignment message. The TFI (2) in the Packet uplink ack/nack message body identifies the TBF. The messages received on this TBF are only acknowledged in this message.

It is further noted that there may be a need to modify the resource allocation on the fly when data from different Radio Bearers are multiplexed through the same uplink resources (TFIs that share the same USF). In such cases an existing or a new access type could be used to request additional resources. In this case the NW may reply by sending a Packet Uplink Assignment or some other message.

As was previously discussed, in the R4 of EGPRS only one data flow per MS is supported, the TFI identifies the MS in the uplink, and only one flow per USF is used.

In accordance with the foregoing teachings, it can be appreciated that the inventors have enabled multiple data flows per MS to be supported, and that the TFI in the uplink header is used for identifying a TBF, not the MS 100 per se. The foregoing teachings beneficially provide the highest number of data flows per MS 100, with little or no impact on the currently specified RLC/MAC block structure and headers. These teachings also increase the flexibility of uplink resource allocation.

Those skilled in the art may derive various modifications to these techniques, when guided by the teachings herein. Thus, while the invention has been particularly shown and described with respect to preferred embodiments thereof, it will be understood by those skilled in the art that changes in form and details may be made therein without departing from the scope and spirit of the invention.

What is claimed is:

1. A mobile station, comprising a wireless transceiver for coupling the mobile station to a wireless network; and a data processor bidirectionally coupled to the transceiver and operating, under control of a program, to be responsive to an allocation of an uplink resource for a temporary block flow of the mobile station on a channel using an uplink state flag, where a given uplink state flag is assigned to one mobile station, for utilizing the allocated uplink resource with at least one other temporary block flow of the mobile station, where for each temporary block flow, a temporary flow identity is used that identifies the temporary block flow thereby enabling the mobile station to transmit at least two flows on the allocated uplink resource on the channel.

2. A mobile station as in claim 1, where there is at least one uplink state flag with at least one temporary block flow per mobile station on a channel.

3. A mobile station as in claim 1, where in one case only temporary block flows that have been assigned to an uplink state flag can be sent on the uplink resource.

4. A mobile station as in claim 1, where for a case where temporary flow identities are unique for a mobile station on the channel, then another temporary block flow that has been assigned to a different uplink state flag of the same mobile station on the same channel is sent on that resource.

5. A mobile station as in claim 1, where an uplink temporary flow identity uniquely identifies a radio bearer.

6. A mobile station as in claim 1, where fast access is achieved for a case where the mobile station has no allocated resources for transmitting a given radio bearer on an already established temporary block flow, by storing in the wireless network at least a mobile station class and radio priority.

7. A mobile station as in claim 1, where at least one of the uplink state flag and the temporary block flow is reserved for the mobile station.

8. A mobile station as in claim 1, where at least one of the uplink state flag and the temporary block flow is reserved for the mobile station until an occurrence of one of a last data block is transmitted or an inactivity counter exceeds a certain value.

9. A mobile station as in claim 1, where the uplink temporary flow identity is used simultaneously by a plurality of mobile stations on the same channel.

10. A wireless communications network, comprising a wireless transceiver for coupling to at least one mobile station and a data processor bidirectionally coupled to the transceiver and operating, under control of a program, to allocate to the mobile station an uplink resource for a temporary block flow on a channel using an uplink state flag, where a given uplink state flag is assigned to one mobile station, and responsive to use of the allocated uplink resource with at least one other temporary block flow of the mobile station, where for each temporary block flow, a temporary flow identity is used that identifies the temporary block flow thereby enabling the network to receive from the mobile station at least two flows on the allocated uplink resource on the channel.

11. A wireless communications network as in claim 10, where there is at least one uplink state flag with at least one temporary block flow per mobile station on a channel.

12. A wireless communications network as in claim 10, where in one case only temporary block flows that have been assigned to an uplink state flag can be sent on the uplink resource.

13. A wireless communications network as in claim 10, where for a case where temporary flow identities are unique for a mobile station on the channel, then another temporary block flow that has been assigned to a different uplink state flag of the same mobile station on the same channel is sent on that resource.

14. A wireless communications network as in claim 10, where an uplink temporary flow identity uniquely identifies a radio bearer.

15. A wireless communications network as in claim 10, where fast access is achieved for a case where the mobile station has no allocated resources for transmitting a given radio bearer on an already established temporary block flow, by storing in the wireless communications network at least a mobile station class and radio priority.

16. A wireless communications network as in claim 10, where at least one of the uplink state flag and the temporary block flow is reserved for the mobile station.

17. A wireless communications network as in claim 10, where at least one of the uplink state flag and the temporary block flow is reserved for the mobile station until an occurrence of one of a last data block is transmitted or an inactivity counter exceeds a certain value.

18. A wireless communications network as in claim 10, where the uplink temporary flow identity is used simultaneously by a plurality of mobile stations on the same channel.

* * * * *